US012581348B2

(12) United States Patent
Da Silva et al.

(10) Patent No.: US 12,581,348 B2
(45) Date of Patent: Mar. 17, 2026

(54) CHANNEL SOUNDING FOR WIRELESS LOCAL AREA NETWORK SENSING

(71) Applicant: Intel Corporation, Santa Clara, CA (US)

(72) Inventors: Claudio Da Silva, Portland, OR (US); Cheng Chen, Portland, OR (US); Bahareh Sadeghi, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/401,236

(22) Filed: Dec. 29, 2023

(65) Prior Publication Data

US 2024/0137185 A1 Apr. 25, 2024

Related U.S. Application Data

(63) Continuation of application No. 17/337,300, filed on Jun. 2, 2021, now abandoned.

(60) Provisional application No. 63/034,119, filed on Jun. 3, 2020.

(51) Int. Cl.
| | |
|---|---|
| *H04W 24/10* | (2009.01) |
| *H04L 5/00* | (2006.01) |
| *H04W 72/044* | (2023.01) |
| *H04B 7/06* | (2006.01) |
| *H04W 84/12* | (2009.01) |

(52) U.S. Cl.
CPC ........... *H04W 24/10* (2013.01); *H04L 5/0007* (2013.01); *H04L 5/0057* (2013.01); *H04W 72/046* (2013.01); *H04W 72/0473* (2013.01); *H04B 7/0617* (2013.01); *H04W 84/12* (2013.01)

(58) Field of Classification Search
CPC ..................................................... H04W 24/10
See application file for complete search history.

(56) References Cited

U.S. PATENT DOCUMENTS

| | | | | |
|---|---|---|---|---|
| 2014/0328247 A1* | 11/2014 | Silverman | ........... | H04L 25/0204 |
| | | | | 370/328 |
| 2015/0139127 A1* | 5/2015 | Oh | ..................... | H04L 25/0204 |
| | | | | 370/329 |
| 2017/0257859 A1* | 9/2017 | Li | ........................ | H04L 5/0044 |
| 2018/0213424 A1* | 7/2018 | Du | ........................ | H04W 24/00 |
| 2019/0341988 A1* | 11/2019 | Schelstraete | ......... | H04B 7/0452 |
| 2022/0321301 A1* | 10/2022 | Yu | ........................ | H04L 5/0051 |

* cited by examiner

*Primary Examiner* — Jason E Mattis
(74) *Attorney, Agent, or Firm* — Gray Ice Higdon, PLLC

(57) ABSTRACT

This disclosure describes systems, methods, and devices related to WLAN sensing sounding. A device may identify a sensing null data packet (NDP) request frame received from a second device, the sensing NDP request frame associated with performing a wireless local area network channel sounding procedure; identify transmit parameters included in a transmit control field of the sensing NDP request frame; generate an NDP frame using the transmit parameters; and send, in response to the sensing NDP request frame, the NDP frame to the second device.

20 Claims, 15 Drawing Sheets

300

900

IDENTIFY, AT A FIRST DEVICE, A SENSING NULL DATA PACKET (NDP) REQUEST FRAME RECEIVED FROM A SECOND DEVICE ⟋902

IDENTIFY TRANSMIT PARAMETERS INCLUDED IN A TRANSMIT CONTROL FIELD OF THE SENSING NDP REQUEST FRAME ⟋904

GENERATE AN NDP FRAME USING THE TRANSMIT PARAMETERS ⟋906

SEND THE NDP FRAME TO THE SECOND DEVICE IN RESPONSE TO THE SENSING NDP REQUEST FRAME ⟋908

CHANNEL SOUNDING FOR WIRELESS LOCAL AREA NETWORK SENSING

CROSS-REFERENCE TO RELATED APPLICATION(S)

This application is a continuation of U.S. Non-Provisional application Ser. No. 17/337,300, filed Jun. 2, 2021, which claims the benefit of U.S. Provisional Application No. 63/034,119, filed Jun. 3, 2020, the disclosures of which are incorporated herein by reference as if set forth in full.

TECHNICAL FIELD

This disclosure generally relates to systems, methods, and devices for wireless communications and, more particularly, for channel sounding for wireless local area network sensing.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
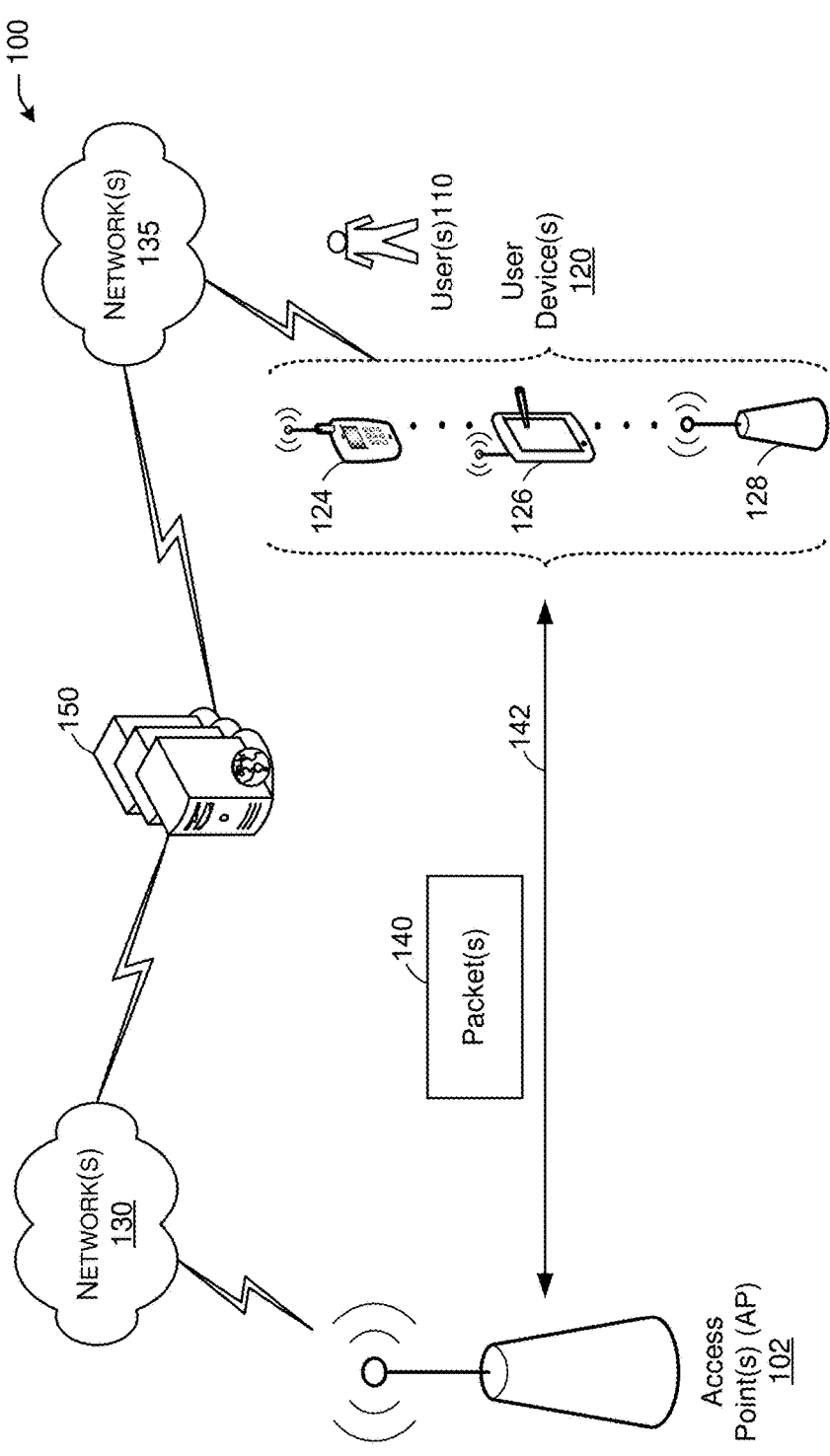
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11 family of standards provides the technology for Wi-Fi communications, and the IEEE 80211bf standard is being defined for wireless local area network (WLAN) sensing. The IEEE 80211bf standard will allow station devices (STAs) to communicate their WLAN sensing capabilities to other STAs and to establish transmissions that allow for the performance of WLAN channel sensing measurements. Wi-Fi sensing is a term given to technologies that use traditional Wi-Fi to perform radar-like applications such as detecting motion in a room. Wi-Fi sensing allows for motion detection, gesture recognition, and biometric measurements using Wi-Fi signals. Sensing is performed by tracking channel estimates obtained with multiple Wi-Fi packets (e.g., physical layer protocol data units—PPDUs) over time, and detecting changes that may indicate an event of interest (e.g., whether motion is present).

In Wi-Fi sensing (or wireless local area network sensing—WLAN sensing), sensing (e.g., motion sensing) may be performed by tracking changes/variations in channel estimates obtained with multiple Wi-Fi packets over time—which could have been sent by one or more devices—and detecting patterns that indicate an event of interest, such as motion in a room. For example, channel state information (CSI) may refer to information that characterizes the propagation of wireless signals from a transmitter to a receiver at different carrier frequencies. A channel frequency response (CFR) may represent a CSI entry, including an amplitude and phase of a wireless signal. CSI may be based on the carrier frequency (e.g., different carrier frequencies may have different CFRs), propagation delay, and an amplitude attenuation factor. A CSI amplitude and phase may be affected by movements of transmitter and/or receiver devices, objects, and people. As such, when a CSI (e.g., a CFR) varies over time, such may indicate the presence and motion of people or objects. In this manner, the variance of CSI channel measurements for a communication link over time may indicate the presence of motion.

There are at least two possible approaches that stations performing WLAN sensing could use today (that is, with no support of a WLAN sensing amendment to the IEEE 802.11 standards): (1) Opportunistically, using data and management frames, and (2) using a beamforming channel sounding procedure. However, each of these approaches has limitations, including overhead, used of compressed feedback, and lack of a mechanism that freezes transmit configurations when multiple null data packets (NDPs) are sent.

WLAN sensing implementations usually fall in one of two categories. The first category is when a same device transmits and receives a waveform—similar to conventional radars (e.g., frequency-modulated continuous wave radar). It is usually implemented using millimeter wave (mmWave) technology (e.g., defined by the IEEE 802.11ad/ay standards) and Doppler processing, and typically used for short-range, high-resolution applications such as gesture recognition. The second category is when sensing is performed by tracking one or more wireless links between one "sensing" STA (e.g., an access point) and one or more "transmit" STAs (clients, for example). It is usually implemented using 2.4/5/6 GHz Wi-Fi technology and makes use of artificial intelligence (AI) and/or machine learning (ML) algorithms to classify time-variations in the wireless channels into events/activities. The second category supports wide coverage (e.g., single-family home) and lower-resolution applications such as home security and smart buildings.

There are at least two possible approaches that a station performing sensing, denoted by STA 1, could use to obtain estimates of the channel from a second station, denoted by STA 2, over time, each with their own limitations: (1) STA 1 could "opportunistically" obtain channel estimates by physical layer (PHY) protocol data units (PPDUs) sent by STA 2 (e.g., data and management frames, for example), which could be addressed either to STA 1 or to another STA. An advantage to this approach is that the IEEE 802.11 standards may not need to be changed. However, disadvantages may include difficulty or impossibility of guaranteeing a regular periodicity of CSI estimates, overhead (e.g., if transmission must be triggered by STA 1, such as by pinging), and that the number of streams may be limited to those used in the data exchange. (2) STA 1 could send an NDP to STA 2 and track the channel by using the NDP feedback sent in return. An advantage to this approach is that the IEEE 802.11 standards may not need to be changed. However, disadvantages may include STA 1 needing to track the channel by using a compressed beamforming feedback matrix sent by STA 2, rather than the actual channel estimate (e.g., possibly resulting in performance degradation of the sensing application), and the feedback sent by STA 2 may require significant airtime, especially when the number of streams and bandwidth increase. It is worth noting that the first approach could be implemented by using beacon frames when STA 2 is an access point (AP) STA. In this case, estimates may be obtained with a certain regularity with no need for STA 1 to trigger transmissions. However, such an approach has its own limitations; for example, channel estimates may be limited to 20 MHz. The use of the compressed beamforming feedback matrix in the second approach may refer to the NDP procedure defined in VHT (e.g., Clause 21) and re-used in 802.11ax. While the HT (Clause 19) specification defines feedback of the actual CSI matrix (EXPANSION_MAT_TYPE is CSI_MATRICES), it was not incorporated into very high throughput (VHT) applications.

The sensing application of STA 1 may track channel estimates over time, and may detect and classify events of interest. However, the channel variations observed by STA 1 may be a result of different occurrences, including: (1) actual motion in the environment (e.g., a person enters a room), or (2) changes in the transmit settings used by STA 2, such as transmit power adaptation, changes in the number of transmit antennae and/or spatial streams, and/or an update to a spatial mapping matrix. While a sensing implementation could attempt to learn/classify the behavior of the transmitter and mitigate the impact of transmit setting changes to the sensing application, it might be computationally intensive to do so.

There is therefore a need for channel sounding for WLAN sensing.

Example embodiments of the present disclosure relate to systems, methods, and devices for channel sounding for WLAN sensing.

In one or more embodiments, an efficient and reliable way for WLAN sensing applications sound a channel/environment with the use of null data packets (NDPs) is disclosed. The disclosed procedures incorporate unique characteristics of WLAN sensing.

In one embodiment, a WLAN Sensing Sounding system may facilitate a WLAN sensing protocol that: (1) Is based on a simple request-and-response sounding procedure and can be built upon to define more complex sensing protocols (e.g., those that include scheduling). (2) Relies on the transmission of an NDP. As opposed to the standard (e.g., beamforming) sounding procedure, in this new procedure, the NDP may be transmitted by the responding STA (i.e., the beamformee in a beamforming sounding procedure). (3) Addresses unique characteristics of WLAN sensing, including the fact that NDPs sent in response to different requests by the same STA can be configured to be transmitted with the same set of transmit parameters, including spatial mapping matrix.

In one or more embodiments, the present disclosure may provide for WLAN sensing applications that track one or more wireless links over time (that is, the second category described above). Such applications may rely on the fact that as a person or object moves around a given environment, the movement impacts how a Wi-Fi signal propagates from transmitter to receiver (e.g., propagation paths are created and destructed generating time-varying multipath fading). Applications of commercial interest may be implemented by tracking multiple wireless links over time and using AI/ML algorithms to classify channel variations into events/activities.

In one or more embodiments, to increase the likelihood that the sensing STA can obtain measurements with a regular periodicity and so that WLAN sensing applications do not experience loss in performance resultant from the use of compressed beamforming feedback, the present disclosure may define sounding for WLAN sensing. Specifically, (1) The sensing station (STA 1) sends a frame to another station (STA 2) requesting that STA 2 transmits an NDP. The request frame may include information for the transmit parameters to be used by STA 2 when transmitting the NDP. (2) The station that receives the NDP request (STA 2) sends an NDP announcement frame followed by an NDP to STA 1. Different from the conventional beamforming NDP procedure, in WLAN sensing sounding, the NDP may be sent by the "beamformee" (STA 2) and not by the "beamformer" (STA 1).

In one or more embodiments, the NDPs sent by a station (e.g., STA 2) in response to different sensing requests from the same STA (e.g., STA 1) may be transmitted with the same set of transmit parameters, unless specified by the STA that sends the sensing NDP request. To address this issue, in addition to fields traditionally found in "request" frames, such as Duration, RA, and TA, the sensing NDP request frame may require the definition of fields that are unique/characteristic to WLAN sensing. A possible frame format of the Sensing NDP Request frame is shown in Table 1 below.

TABLE 1

| | | | | | | WLAN Sensing NDP Request Frame Fields: | | |
| | | | | Field: | | | | |
| Frame Control | Duration | Receiver Address (RA) | Transmitter Address (TA) | Sensing NDP Dialog Token | Sensing NDP Transmit Control | Other fields | Frame Check Sequence (FCS) |
| Octets: | 2 | 2 | 6 | 6 | 1 | Variable | Variable | 4 |

In one or more embodiments, the Sensing NDP Transmit Control field of the WLAN sensing NDP request field, as shown in Table 1, may be defined in one of the following ways: (1) The information contained in the Sensing NDP Transmit Control field consists of a single bit (denoted by TX Configuration Hold subfield) defined as follows: (a) set to 1 to indicate that the STA that receives the Sensing NDP Request frame shall use the same transmit parameters in the transmission of the NDP announcement and NDP than the immediately previous WLAN sensing sounding exchange between the same two STAs (same RA and TA values); (b) set to 0 to indicate that the STA that receives the frame may use any transmit parameters when transmitting the NDP announcement and NDP sent in response to the request. (2) The Sensing NDP Transmit Control field specifies which transmit configuration (denoted by TX Configuration Number subfield), out of a possible N transmit configurations (limited by the number of bits X2), the STA that receives the frame may use in the transmission of the NDP announcement and NDP sent in response to the request. The STA that receives the Sensing NDP Request frame may use the same transmit parameters in the transmission of the NDP announcement and NDP sent in response to requests that have the same transmit (TX) Configuration Number. Different TX Configuration Numbers may correspond to different transmit configurations that vary by one or a few transmit parameters, such as number of TX antennas. The transmit parameters used by the STA that receives the Sensing NDP Request for a given TX Configuration Number may be implementation dependent. Implementations may use the same transmit configuration for more than one TX Configuration Number, including using the same configuration for all TX Configuration Numbers. For Example: If the TX Configuration Number subfield is three bits long, STAs would have up to eight transmit configurations that it could use when responding to a Sensing NDP Request frame. (3) The Sensing NDP Transmit Control field specifies the transmit configuration that is to be used by the STA that receives the frame when transmitting the NDP announcement and NDP sent in response to the request. The transmit parameters defined in the Sensing NDP Transmit Control field may include TX power level and number of transmit antennas, among others. In option (3), not all transmit parameters may be configured through the Sensing NDP Transmit Control field. Some of them, such as the TX Power Level, could be fixed to the same value for all transmissions between the two STAs. Other parameters, such as the number of transmit antennas could be configured using the Sensing NDP Transmit Control field. In other words, the Sensing NDP Transmit Control field could only cover a few of the possible transmit parameters (Table 1), while the others would be fixed to a value that is implementation dependent. The formats for options (1)-(3) are shown below in Tables 2-4, respectively.

TABLE 2

| | |
| Option (1) for the Sensing NDP Transmit Control field of the WLAN sensing NDP request field: | |
| Field: | Reserved | TX Configuration Hold |
| Bits: | 7 | 1 |

TABLE 3

| | |
| Option (2) for the Sensing NDP Transmit Control field of the WLAN sensing NDP request field: | |
| Field: | Reserved | TX Configuration Number |
| Bits: | X1 | X2 |

TABLE 4

| | | |
| Option (3) for the Sensing NDP Transmit Control field of the WLAN sensing NDP request field: | | |
| Field: | TX Power Level | Number of Transmit Antennas | . . . |
| Bits: | X1 | X2 | . . . |

In one or more embodiments, the present disclosure provides that NDPs sent by a given station in response to different sensing NDP requests by the same STA may be transmitted with the same set of transmit parameters, unless specified otherwise. To be exact, by "same set of transmit parameters," we mean that the TXVECTORs that cause the transmission of multiple NDPs may have the same value for the parameters listed in Table 5 below for the different types of NDP that could be used (HT NDP, VHT NDP, and HE sounding NDP). A high-efficiency (HE) ranging NDP may also be used in WLAN sensing sounding, and its configuration parameters include those of HE sounding NDPs as well as those specific to ranging and secure ranging.

TABLE 5

| Parameters defined in the sensing NDP request frame: | | |
| --- | --- | --- |
| HT NDP | VHT NDP | HE sounding NDP |
| TXPWR_LEVEL_INDEX | TXPWR_LEVEL_INDEX | TXPWR_LEVEL_INDEX |
| MCS | NUM_STS | NUM_STS |
| N_TX | N_TX | MIDAMBLE_PERIODICITY |
| ANTENNA_SET | CH_BANDWIDTH | HE_LTF_TYPE |
| CH_BANDWIDTH | | GI_TYPE |
| CH_OFFSET | | N_TX |
| | | CH_BANDWIDTH |

Referring to Table 5, the following transmit parameter values defined for high throughput (HT) NDPs in Section 10.34.2 of IEEE 802.11-2016 are also valid for WLAN sensing sounding: STBC shall be set to 0; NUM_EX-TEN_SS shall be set to 0; LENGTH shall be set to 0; SOUNDING shall be set to SOUNDING; and MCS shall indicate two or more spatial streams. SMOOTHING, which should be set to SMOOTHING_NOT_REC in the transmission of HT NDP, has no impact for WLAN sensing sounding. The following transmit parameter values defined for VHT NDPs in Section 10.34.6 of IEEE 802.11-2016 are also valid for WLAN sensing sounding: APEP_LENGTH shall be set to 0; NUM_USERS shall be set to 1; and NUM_STS shall indicate two or more space-time streams. BEAM-FORMED has no impact for WLAN sensing sounding. The following transmit parameter values defined for HE sounding NDPs in Section 26.7.5 of IEEE P802.11ax/D6.0 are also valid for WLAN sensing sounding: APEP_LENGTH shall be set to 0; SPATIAL_REUSE shall be set to PSR_AND_NON_SRG_OBSS_PD_PROHIBITED; and BSS_COLOR is set to the value indicated in a BSS Color subfield of the HE Operation element received or transmitted by the HE AP. BEAMFORMED has no impact for WLAN sensing sounding. The number of HE-LTF symbols in the HE sounding NDP is indicated in the NSTS and Midamble Periodicity field in the HE-SIG-A field. An HE STA that transmits an HE SU PPDU shall set the TXVEC-TOR parameter BEAM_CHANGE to 1 if the number of spatial streams is greater than 2.

In one or more embodiments, other fields that may be included in addition to the fields of Table 1 may include: A Duration field: Sets a network allocation vector (NAV) that protects up to the estimated end of a sequence of the multiple frames transmitted in a WLAN sensing sounding instance. This would be defined using the same principles used for other procedures/exchanges found in Section 9.2.5 of IEEE 802.11-2016. Receiver address (RA) field: Set to the address of the STA that will transmit the NDP announcement frame followed by an NDP. Transmitter address (TA) field: Set to the address of the STA transmitting the sensing NDP request frame. Sensing NDP Dialog Token: Includes a value selected by the station to identify the sensing NDP request frame.

In one or more embodiments, in the generation of HT, VHT, and HE PPDUs, the transmitter may use a spatial mapping matrix $Q_k$ that maps space-time streams to transmit chains. As defined in IEEE 802.11-2016, the spatial mapper may provide for direct mapping, spatial expansion, and beamforming. In principle, a transmitter may use different spatial mapping matrices in the transmission of each PPDU. This fact is an issue for WLAN sensing since, as previously discussed, the sensing receiver will observe changes in the channel estimate if the spatial mapping matrix changes, and will not be able to determine if the change results from motion in the environment or from a transmitter adaptation (in this case, use of a different spatial mapping matrix). Therefore, similar to what have been proposed to other parameters, we must define that the spatial mapping matrix used in the transmission of NDPs sent in response to different requests by the same STA shall be the same. However, different from other transmit parameters, the spatial mapping matrix is not defined by a TXVECTOR parameter. To address this issue, the present disclosure provides the following alternatives: (1) Define in Clauses 10 and 26 that the spatial mapping matrix used in the transmission of NDPs sent in response to different requests by the same STA shall be the same unless specified otherwise. If the Sensing NDP Transmit Control field in the Sensing NDP Request frame consists of a single-bit TX Configuration Hold subfield, then, when set to 1, the STA that receives the Sensing NDP Request frame shall use the same spatial mapping matrix used in the immediately previous WLAN sensing sounding exchange between the same two STAs (same RA and TA values). Otherwise, if set to 0, the transmitter may change the matrix. If the Sensing NDP Transmit Control field in the Sensing NDP Request frame consists of a TX Configuration Number subfield, then the STA that receives the Sensing NDP Request frame shall use the same spatial mapping matrix when transmitting NDPs in response to requests that contain the same configuration number. (2) Define in Clauses 10 and 26 a specific spatial mapping matrix that shall be used in the transmission of NDPs sent in response to a Sensing NDP request. For example, the spatial mapping matrix $Q_k$ may be defined to be an identity matrix.

In one or more embodiments, it may be advantageous for certain sensing implementations that the sensing station (STA 1) receives multiple NDPs from the same station (STA 2) with a short time interval (e.g., SIFS). In this case, the sensing application could track both short (multiple NDPs in a single sensing NDP request separated by SIFS) and long (multiple sensing NDP requests separated by an interval much longer than SIFS) term variation characteristics/statistics of the channel. In the proposed extensions, a station that receives a sensing NDP request transmits either multiple NDPs consecutively with short intervals between them, or multiple consecutive transmissions of an NDP announcement followed by an NDP. In both cases, the interval between the packets is SIFS. The number of NDPs or successive transmissions of an NDP announcement followed by an NDP sent in a WLAN sensing sounding instance is specified by the station that sends the sensing NDP request. This could be done in at least two forms: (1) By using the proposed Sensing NDP Transmit Control field (FIG. 6) within the Sensing NDP Request frame through the creation of a new subfield. (2) By creating a new field within the Sensing NDP Request frame.

In one or more embodiments, a second natural extension of WLAN sensing sounding would be to allow the station that sends a sensing NDP request frame (STA 1) to address it to multiple stations and set up NDP transmissions with each of them (STA 2, STA 3, and so on). It is important to note that the NDP announcement and the NDP sent by each station in the procedure are single-user transmissions. The use of multi-user transmissions in WLAN sensing is possible. In this case, the RA of the sensing NDP request frame is set to the broadcast address, and the frame includes more than one "STA Info" fields. If the sensing NDP Request frame format is also used for the single responder case, the frame MAY include a single STA Info field, and the RA of the sensing NDP Request frame would be set to the MAC address of STA 2. The frame format when there is more than one STA Info field is shown below in Table 6.

TABLE 6

| Sensing NDP Request frame format with more than one STA Info field: | | | | | | | | |
|---|---|---|---|---|---|---|---|---|
| | | | | Field | | | | |
| | | | | Sensing NDP Dialog Token | STA Info 1 | ... | STA Info n | FCS |
| | Frame Control | Duration | RA | TA | | | | |
| Octets | 2 | 2 | 6 | 6 | 1 | Variable | | Variable | 4 |

In one or more embodiments, in addition to the transmit configuration information, the STA info field also may include the association identifier (AID) or, alternatively, a compressed version of the AID, such as the twelve least significant bits, of an STA expected to transmit an NDP announcement frame followed by an NDP, as well as scheduling information and/or transmit opportunity (TXOP) information. Optional formats for the STA info field are shown below in Tables 7-9.

TABLE 7

| STA Info field: | | |
|---|---|---|
| AID | TXOP | TX Configuration Hold |

TABLE 8

| STA Info field: | | |
|---|---|---|
| AID | TXOP | TX Configuration Number |

TABLE 9

| STA Info field: | | | | |
|---|---|---|---|---|
| AID | TXOP | TX Power Level | Number transmit antennas | ... |

In one or more embodiments, the more than one sensing responder case, instead of defining a new frame (e.g., sensing NDP request frame), alternatively a variant of the HE Trigger frame may be defined, and may include, in addition to—or in place of—information that is already defined to support beamforming, the sensing-specific information previously discussed (e.g., Tables 7-9). The sensing-specific information could be defined in both the Common Info field and User Info list, as defined in Section 9.3.1.22 in IEEE 802.11ax/D6.0.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, according to some example embodiments of the present disclosure. Network environment 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
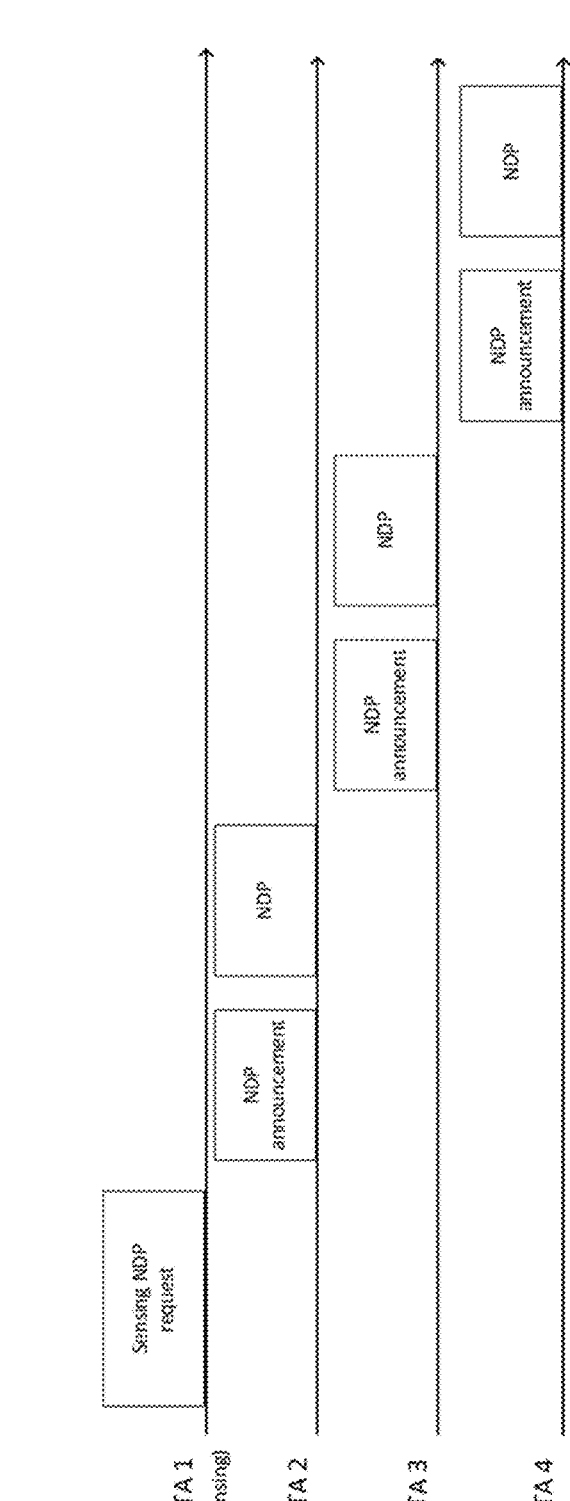
FIG. 8 illustrates an example WLAN sensing sounding procedure with multiple responders, in accordance with one or more example embodiments of the present disclosure.
Figure 9:
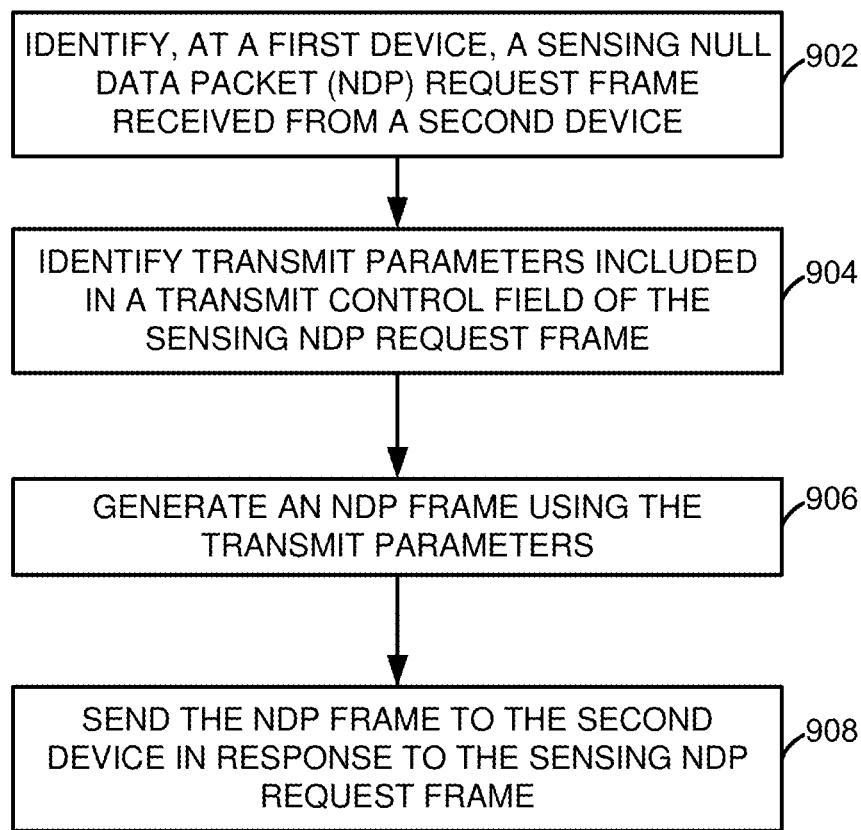
FIG. 9 illustrates a flow diagram of illustrative process for an illustrative WLAN sensing sounding system, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate receiver diversity for Wi-Fi sensing with one or more user devices 120. For example, the AP 102 and the one or more user devices 120 may exchange packets 140 (e.g., Sensing NDP requests and responses, NDP announcements, NDPs, other frames used for sounding for WLAN sounding as defined herein, beamforming feedback, etc.), which may include a negotiation between the AP 102 and the one or more user devices 120, and/or may include channel measurement frames, and/or channel measurement reports used to perform Wi-Fi sensing. The packets 140 may be sent over one or more communication links 142 (e.g., a respective link between any two devices), and any of the one or more communication links 142 may experience CSI variance over time (e.g., as determined by the AP 102, the one or more user devices 120, and/or one or more cloud servers 150 based on the transmission of multiple packets over a given link over time). Any of the AP 102, the one or more user devices 120, and/or one or more cloud servers 150 may determine CSI variance of link of the one or more communication links 142 over time, and may generate the value indicating the CSI variance in the respective link. As explained further herein, any of the AP 102, the one or more user devices 120, and/or one or more cloud servers 150 may collect the channel variance values determined by multiple devices, and may use the channel variance values to determine whether motion occurred anywhere along the one or more communication links 142.

In one embodiment, and with reference to FIG. 1, AP 102 may communicate with the one or more cloud servers 150 using the one or more communications networks 130, and the one or more user devices 120 may communicate with one or more cloud servers 150 using the one or more communications networks 135. The AP 102 and/or the one or more user devices 120 may send CSI or the channel variance values to the one or more cloud servers 150 for analysis (e.g., to determine the presence of motion).

It is understood that the above descriptions are for purposes of illustration and are not meant to be limiting.

Figure 2:
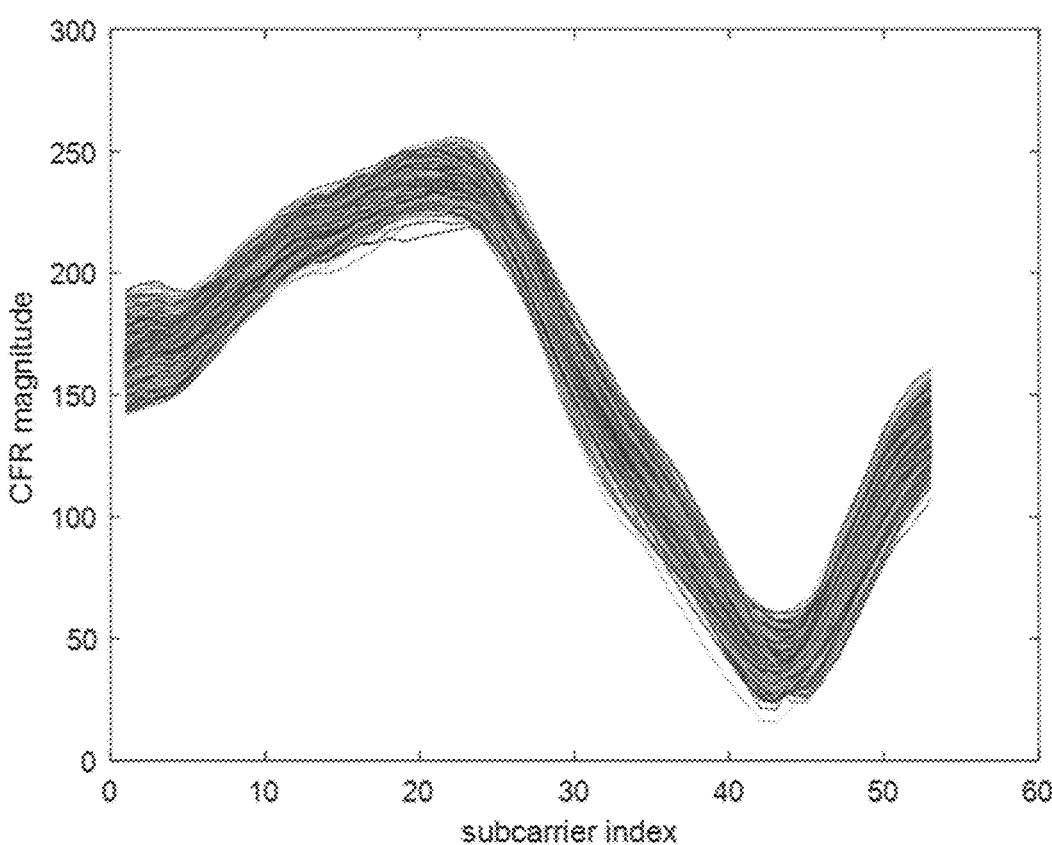
FIG. 2 illustrates example channel frequency responses (CFRs) 200 obtained over time in a static environment with no motion, in accordance with one or more example embodiments of the present disclosure.

FIG. 2 illustrates example channel frequency responses (CFRs) 200 obtained over time in a static environment with no motion, in accordance with one or more example embodiments of the present disclosure.

Figure 3:
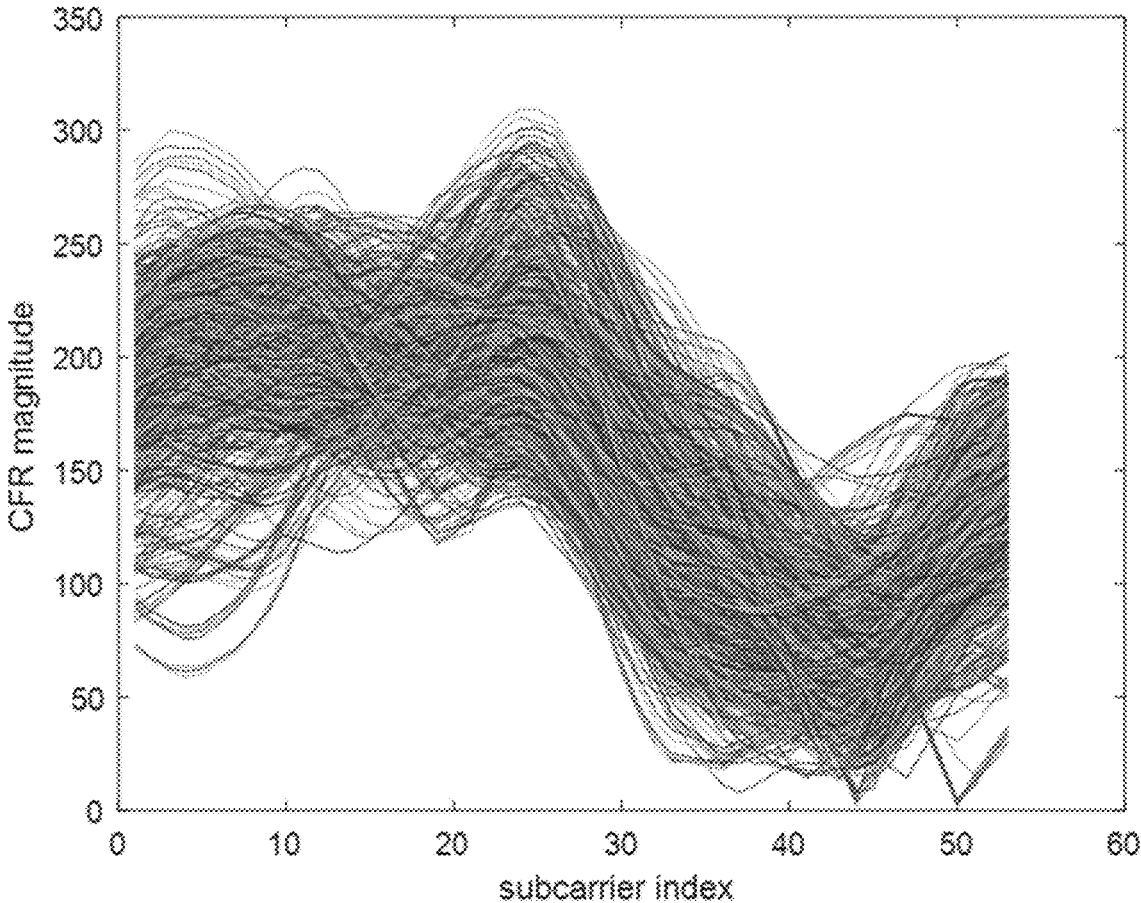
FIG. 3 illustrates example CFRs 300 obtained over time in a dynamic environment with motion, in accordance with one or more example embodiments of the present disclosure.

FIG. 3 illustrates example CFRs 300 obtained over time in a dynamic environment with motion, in accordance with one or more example embodiments of the present disclosure.

Figure 4:
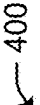
FIG. 4 illustrates a null data packet (NDP) procedure for beamforming, in accordance with one or more example embodiments of the present disclosure.
Figure 4:
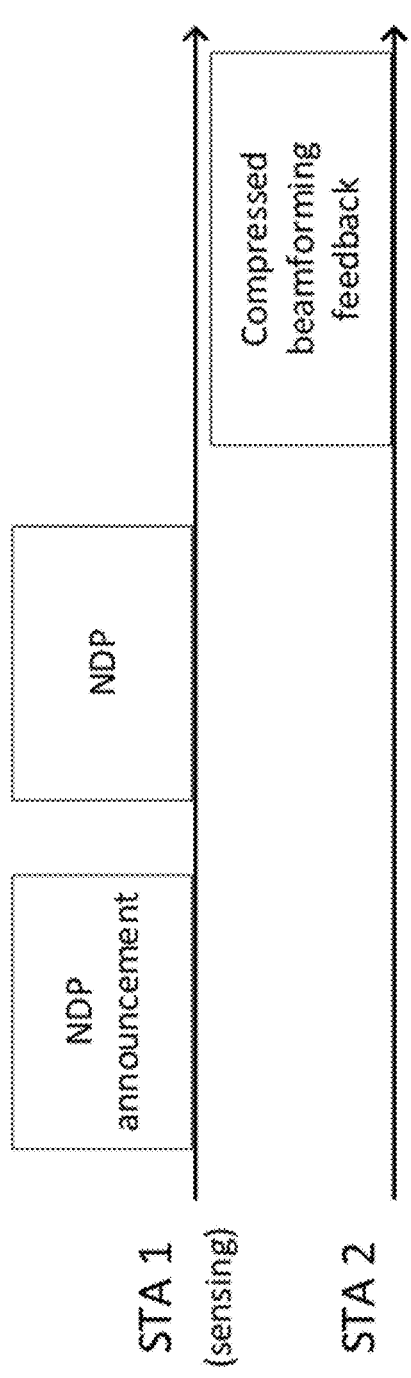

FIG. 4 illustrates an NDP procedure 400 for beamforming, in accordance with one or more example embodiments of the present disclosure.

FIG. 4 may refer to option (2) above, in which STA 1 could send an NDP to STA 2 and track the channel by using the NDP feedback sent in return.

Figure 5:
FIG. 5 illustrates an example WLAN sensing sounding procedure, in accordance with one or more example embodiments of the present disclosure.
Figure 5:
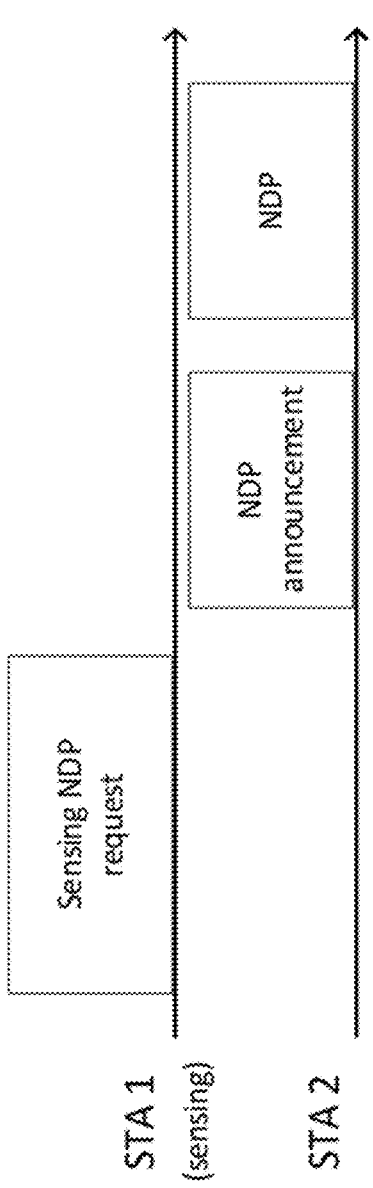

FIG. 5 illustrates an example WLAN sensing sounding procedure 500, in accordance with one or more example embodiments of the present disclosure.

Referring to FIG. 5, to increase the likelihood that the sensing STA can obtain measurements with a regular periodicity and so that WLAN sensing applications do not experience loss in performance resultant from the use of compressed beamforming feedback, the WLAN sensing sounding procedure 500 may be implemented. Specifically, the sensing station (STA 1) sends a frame to another station (STA 2) requesting that it (STA 2) transmits an NDP. The request frame may include information on the transmit parameters to be used by STA 2 when transmitting the NDP. The station that receives the NDP request (STA 2) sends an NDP announcement frame followed by an NDP to STA 1. It is important to note that, different from the conventional beamforming NDP procedure, in WLAN sensing sounding, the NDP is sent by the "beamformee" (STA 2) and not by the "beamformer" (STA 1).

Figure 6:
FIG. 6 illustrates an example WLAN sensing sounding procedure with multiple NDPs, in accordance with one or more example embodiments of the present disclosure.
Figure 6:
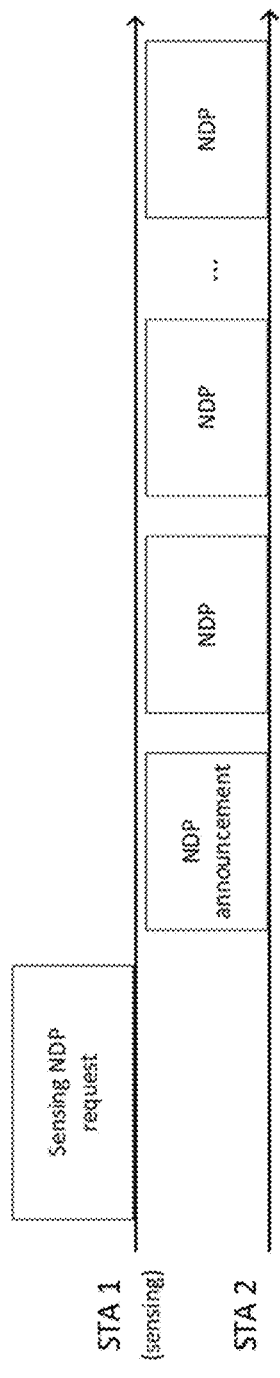

FIG. 6 illustrates an example WLAN sensing sounding procedure 600 with multiple NDPs, in accordance with one or more example embodiments of the present disclosure.

Figure 7:
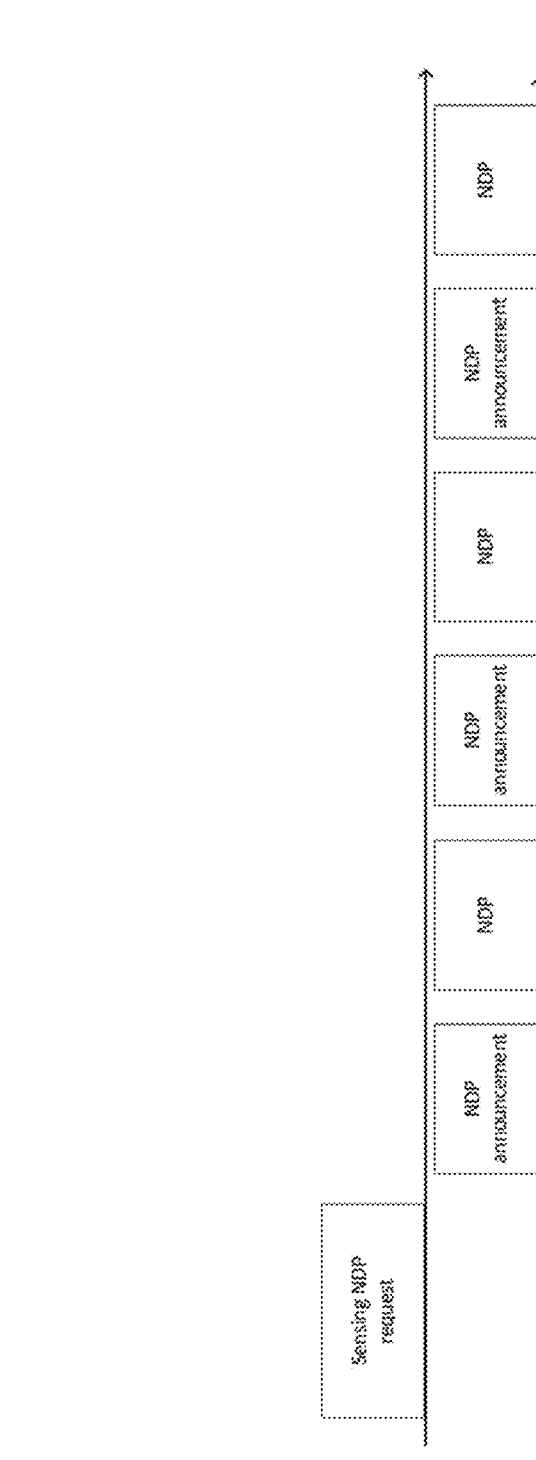
FIG. 7 illustrates an example WLAN sensing sounding procedure with multiple NDPs, in accordance with one or more example embodiments of the present disclosure.

FIG. 7 illustrates an example WLAN sensing sounding procedure 700 with multiple NDPs, in accordance with one or more example embodiments of the present disclosure.

Referring to FIGS. 6 and 7, it may be advantageous for certain sensing implementations that the sensing station (STA 1) receives multiple NDPs from the same station (STA 2) with a short time interval (e.g., SIFS). In this case, the sensing application could track both short (multiple NDPs in a single sensing NDP request separated by SIFS) and long (multiple sensing NDP requests separated by an interval much longer than SIFS) term variation characteristics/statistics of the channel. For this reason, we propose to extend the WLAN sensing sounding as shown in FIGS. 6 and 7. In the proposed extensions, a station that receives a sensing NDP request transmits either multiple NDPs consecutively with short intervals between them (FIG. 6) or multiple consecutive transmissions of an NDP announcement followed by an NDP (FIG. 7). In both cases, the interval between the packets is SIFS. The number of NDPs (FIG. 6) or successive transmissions of an NDP announcement followed by an NDP (FIG. 7) sent in a WLAN sensing sounding instance is specified by the station that sends the sensing NDP request. This could be done in at least two forms: By using the proposed Sensing NDP Transmit Control field within the Sensing NDP Request frame through the creation of a new subfield, or by creating a new field within the Sensing NDP Request frame.

FIG. 8 illustrates an example WLAN sensing sounding procedure 800 with multiple responders, in accordance with one or more example embodiments of the present disclosure.

A second natural extension of WLAN sensing sounding would be to allow the station that sends a sensing NDP request frame (STA 1) to address it to multiple stations and set up NDP transmissions with each of them (STA 2, STA 3, and so on). This procedure is shown in FIG. 8. It is important to note that the NDP announcement and the NDP sent by each station in the procedure are single-user transmissions. The use of multi-user transmissions in WLAN sensing was considered. In this case, the RA of the sensing NDP request frame is set to the broadcast address, and the frame includes more than one "STA Info" fields. If the sensing NDP Request frame format is also used for the single responder case, the frame may include a single STA Info field, and the RA of the sensing NDP Request frame would be set to the MAC address of STA 2.

FIG. 9 illustrates a flow diagram of illustrative process 900 for a WLAN sensing sounding system, in accordance with one or more example embodiments of the present disclosure.

At block 902, a device (e.g., the user device(s) 120 of FIG. 1) may identify a sensing NDP request frame (e.g., the sensing NDP request of FIGS. 5-8), received from a second device (e.g., STA 1 of FIGS. 5-8). The sensing NDP request frame may be a request sent to the device and/or other devices to request the one or more devices to respond one or more times as part of WLAN sensing sounding procedure. The sensing NDP request frame may include transmit parameters and one or more indications of whether the one or more receiving devices (e.g., as addressed in one or more STA info fields of the sensing NDP request frame) are to use the transmit parameters or are permitted to use different transmit parameters when responding to the sensing NDP request frame.

At block 904, the device may identify the transmit parameters and other contents of the sensing NDP request frame. The sensing NDP request frame may be formatted according to Tables 1-9 above.

At block 906, the device may generate one or more NDP frames using the transmit parameters or different transmit parameters (e.g., the NDPs of FIGS. 5-8).

At block 908, the device may send the one or more NDPs to the second device, optionally preceded by respective NDPAs (e.g., FIG. 7) as part of the WLAN sensing sounding procedure.

It is understood that the above descriptions are for purposes of illustration and are not meant to be limiting.

Figure 10:
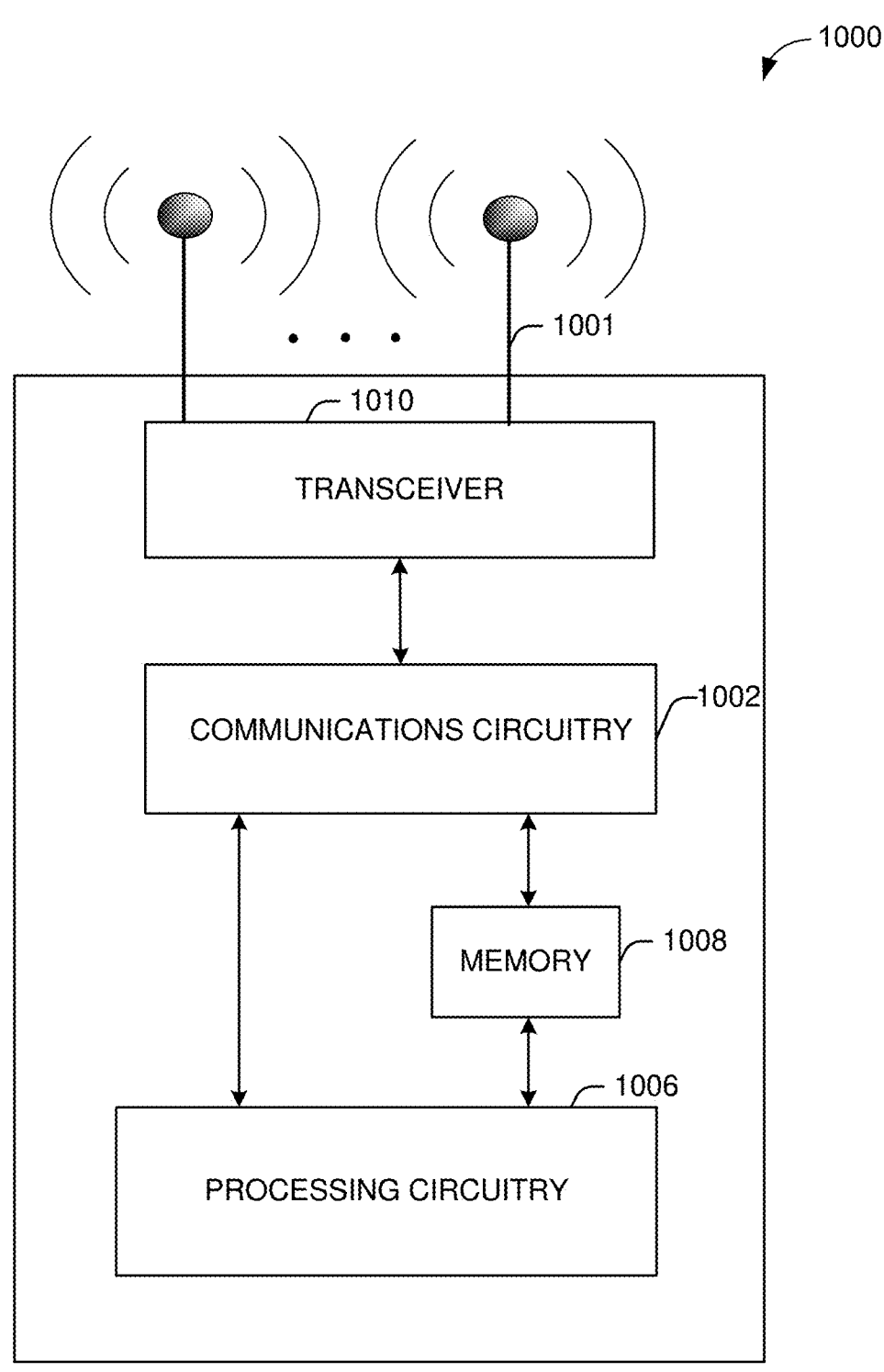
FIG. 10 illustrates a functional diagram of an exemplary communication station that may be suitable for use as a user device, in accordance with one or more example embodiments of the present disclosure.

FIG. 10 shows a functional diagram of an exemplary communication station 1000, in accordance with one or more example embodiments of the present disclosure. In one embodiment, FIG. 10 illustrates a functional block diagram of a communication station that may be suitable for use as an AP 102 (FIG. 1) or a user device 120 (FIG. 1) in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device.

Figure 11:
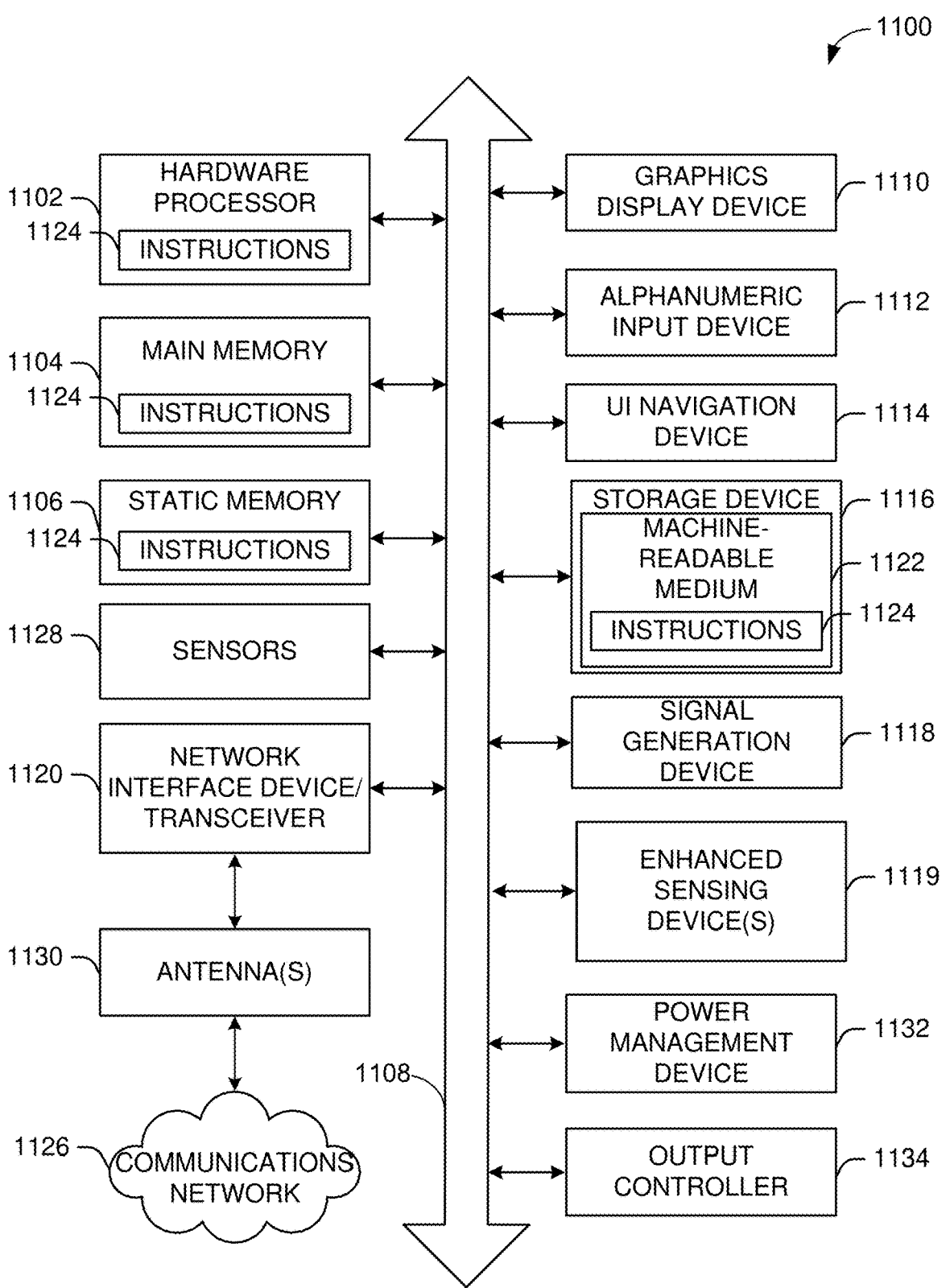
FIG. 11 illustrates a block diagram of an example machine upon which any of one or more techniques (e.g., methods) may be performed, in accordance with one or more example embodiments of the present disclosure.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a WLAN sensing sounding device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the WLAN sensing sounding device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The WLAN sensing sounding device 1119 may carry out or perform any of the operations and processes (e.g., process 900) described and shown above.

It is understood that the above are only a subset of what the WLAN sensing sounding device 1119 may be configured to perform and that other functions included throughout this disclosure may also be performed by the WLAN sensing sounding device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
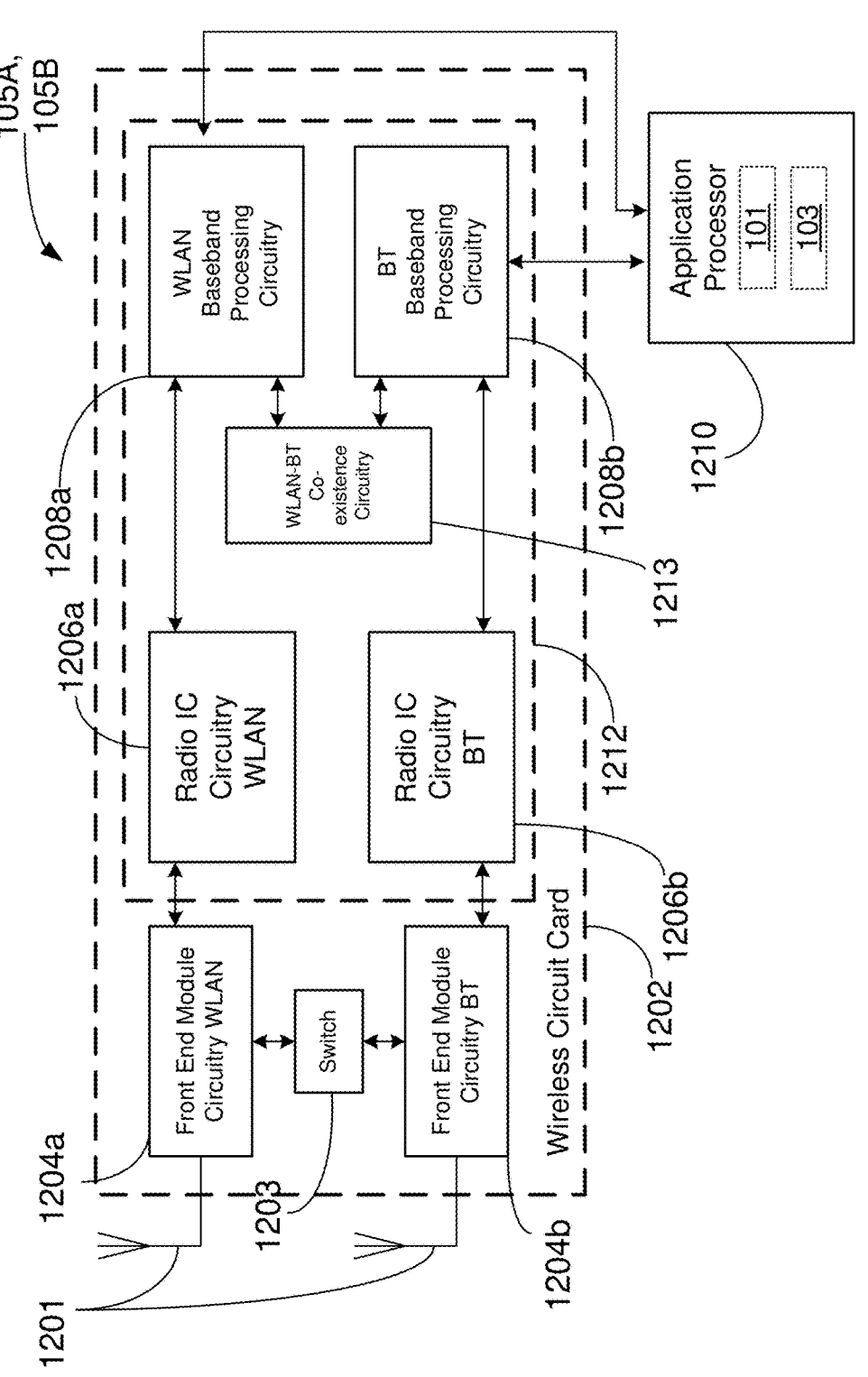
FIG. 12 is a block diagram of a radio architecture in accordance with some examples.

FIG. 12 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1204a-b, radio IC circuitry 1206a-b and baseband processing circuitry 1208a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208a-b may include a WLAN baseband processing circuitry 1208a and a BT baseband processing circuitry 1208b. The WLAN baseband processing circuitry 1208*a* may include a memory, such as, for example, a set of RAM arrays in a Fast Fourier Transform or Inverse Fast Fourier Transform block (not shown) of the WLAN baseband processing circuitry 1208*a*. Each of the WLAN baseband circuitry 1208*a* and the BT baseband circuitry 1208*b* may further include one or more processors and control logic to process the signals received from the corresponding WLAN or BT receive signal path of the radio IC circuitry 1206*a-b*, and to also generate corresponding WLAN or BT baseband signals for the transmit signal path of the radio IC circuitry 1206*a-b*. Each of the baseband processing circuitries 1208*a* and 1208*b* may further include physical layer (PHY) and medium access control layer (MAC) circuitry, and may further interface with a device for generation and processing of the baseband signals and for controlling operations of the radio IC circuitry 1206*a-b*.

Referring still to FIG. 12, according to the shown embodiment, WLAN-BT coexistence circuitry 1213 may include logic providing an interface between the WLAN baseband circuitry 1208*a* and the BT baseband circuitry 1208*b* to enable use cases requiring WLAN and BT coexistence. In addition, a switch 1203 may be provided between the WLAN FEM circuitry 1204*a* and the BT FEM circuitry 1204*b* to allow switching between the WLAN and BT radios according to application needs. In addition, although the antennas 1201 are depicted as being respectively connected to the WLAN FEM circuitry 1204*a* and the BT FEM circuitry 1204*b*, embodiments include within their scope the sharing of one or more antennas as between the WLAN and BT FEMs, or the provision of more than one antenna connected to each of FEM 1204*a* or 1204*b*.

In some embodiments, the front-end module circuitry 1204*a-b*, the radio IC circuitry 1206*a-b*, and baseband processing circuitry 1208*a-b* may be provided on a single radio card, such as wireless radio card 1202. In some other embodiments, the one or more antennas 1201, the FEM circuitry 1204*a-b* and the radio IC circuitry 1206*a-b* may be provided on a single radio card. In some other embodiments, the radio IC circuitry 1206*a-b* and the baseband processing circuitry 1208*a-b* may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 12, the BT baseband circuitry 1208*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
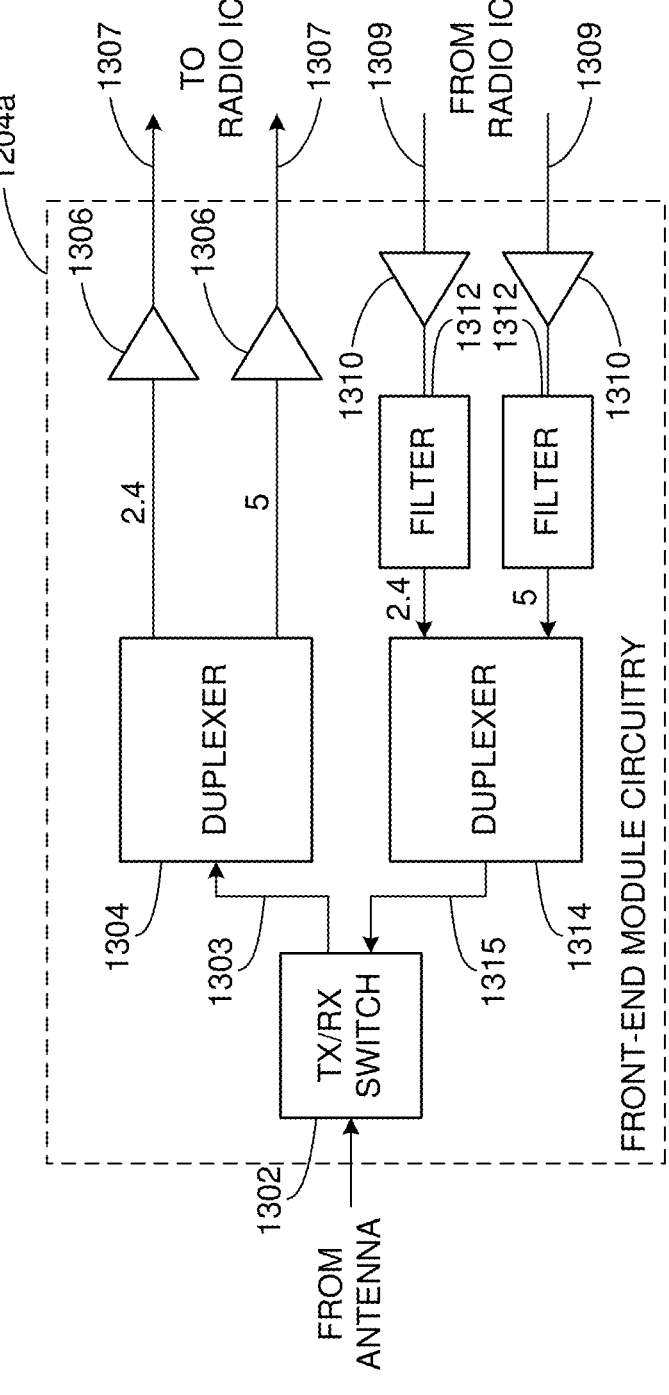
FIG. 13 illustrates an example front-end module circuitry for use in the radio architecture of FIG. 12, in accordance with one or more example embodiments of the present disclosure.

FIG. 13 illustrates WLAN FEM circuitry 1204*a* in accordance with some embodiments. Although the example of FIG. 13 is described in conjunction with the WLAN FEM circuitry 1204*a*, the example of FIG. 13 may be described in conjunction with the example BT FEM circuitry 1204*b* (FIG. 12), although other circuitry configurations may also be suitable.

In some embodiments, the FEM circuitry 1204*a* may include a TX/RX switch 1302 to switch between transmit mode and receive mode operation. The FEM circuitry 1204*a* may include a receive signal path and a transmit signal path. The receive signal path of the FEM circuitry 1204*a* may include a low-noise amplifier (LNA) 1306 to amplify received RF signals 1303 and provide the amplified received RF signals 1307 as an output (e.g., to the radio IC circuitry 1206*a-b* (FIG. 12)). The transmit signal path of the circuitry 1204*a* may include a power amplifier (PA) to amplify input RF signals 1309 (e.g., provided by the radio IC circuitry 1206*a-b*), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204*a* may be configured to operate in either the 2.4 GHz frequency spectrum or the 5 GHz frequency spectrum. In these embodiments, the receive signal path of the FEM circuitry 1204a may include a receive signal path duplexer 1304 to separate the signals from each spectrum as well as provide a separate LNA 1306 for each spectrum as shown. In these embodiments, the transmit signal path of the FEM circuitry 1204a may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204a as the one used for WLAN communications.

Figure 14:
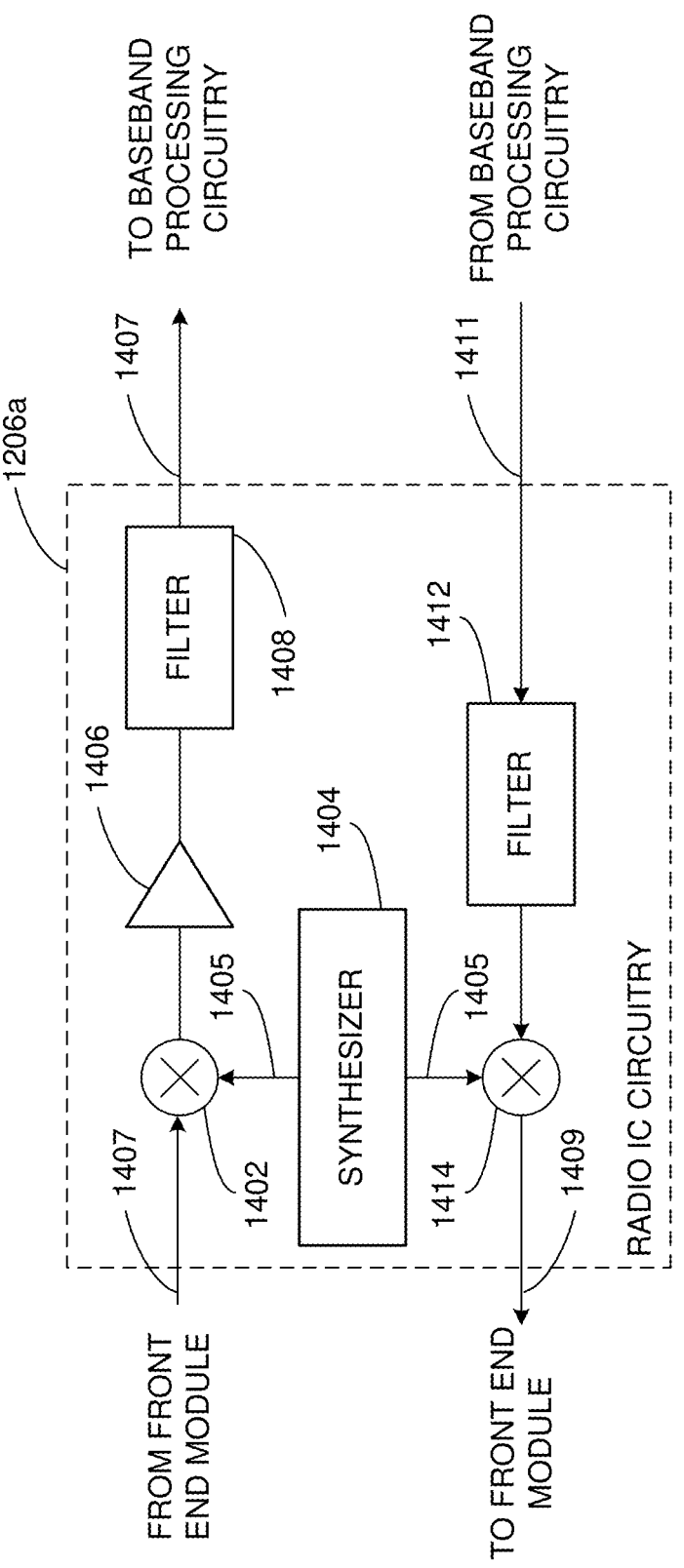
FIG. 14 illustrates an example radio IC circuitry for use in the radio architecture of FIG. 12, in accordance with one or more example embodiments of the present disclosure.

FIG. 14 illustrates radio IC circuitry 1206a in accordance with some embodiments. The radio IC circuitry 1206a is one example of circuitry that may be suitable for use as the WLAN or BT radio IC circuitry 1206a/1206b (FIG. 12), although other circuitry configurations may also be suitable. Alternatively, the example of FIG. 14 may be described in conjunction with the example BT radio IC circuitry 1206b.

In some embodiments, the radio IC circuitry 1206a may include a receive signal path and a transmit signal path. The receive signal path of the radio IC circuitry 1206a may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, upconversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or upconversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct upconversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208a-b (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example secure signal converter 101 or the example received signal converter 103 (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

Figure 15:
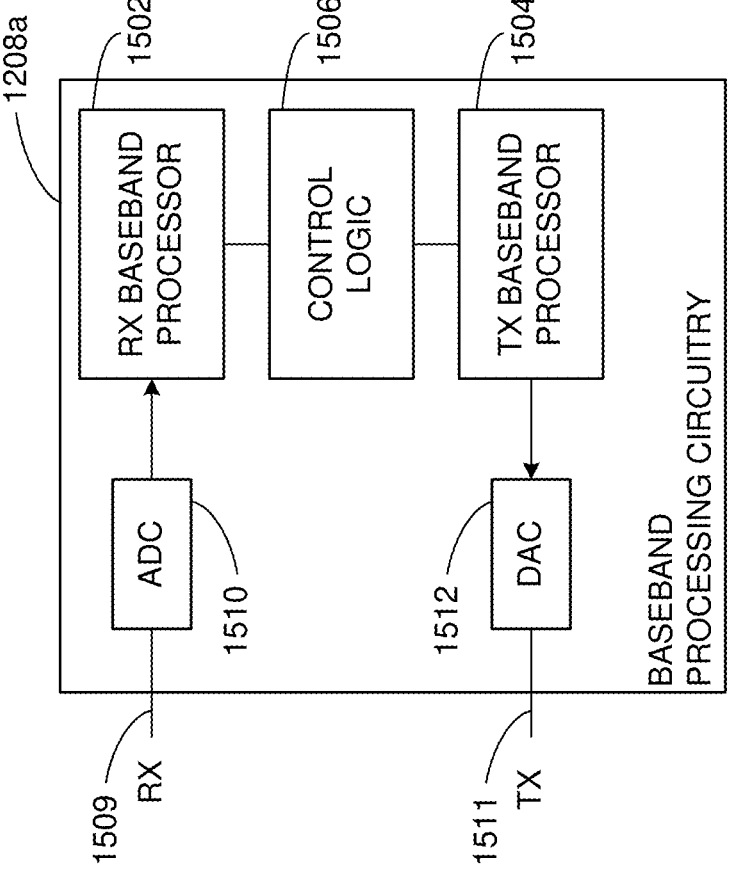
FIG. 15 illustrates an example baseband processing circuitry for use in the radio architecture of FIG. 12, in accordance with one or more example embodiments of the present disclosure.

FIG. 15 illustrates a functional block diagram of baseband processing circuitry 1208a in accordance with some embodiments. The baseband processing circuitry 1208a is one example of circuitry that may be suitable for use as the baseband processing circuitry 1208a (FIG. 12), although other circuitry configurations may also be suitable. Alternatively, the example of FIG. 14 may be used to implement the example BT baseband processing circuitry 1208b of FIG. 12.

The baseband processing circuitry 1208a may include a receive baseband processor (RX BBP) 1502 for processing receive baseband signals 1409 provided by the radio IC circuitry 1206a-b (FIG. 12) and a transmit baseband processor (TX BBP) 1504 for generating transmit baseband signals 1411 for the radio IC circuitry 1206a-b. The baseband processing circuitry 1208a may also include control logic 1506 for coordinating the operations of the baseband processing circuitry 1208a.

In some embodiments (e.g., when analog baseband signals are exchanged between the baseband processing circuitry 1208a-b and the radio IC circuitry 1206a-b), the baseband processing circuitry 1208a may include ADC 1510 to convert analog baseband signals 1509 received from the radio IC circuitry 1206a-b to digital baseband signals for processing by the RX BBP 1502. In these embodiments, the baseband processing circuitry 1208a may also include DAC 1512 to convert digital baseband signals from the TX BBP 1504 to analog baseband signals 1511.

In some embodiments that communicate OFDM signals or OFDMA signals, such as through baseband processor 1208a, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may be a device comprising memory and processing circuitry configured to: identify a sensing null data packet (NDP) request frame received from a second device, the sensing NDP request frame associated with performing a wireless local area network channel sounding procedure; identify transmit parameters included in a transmit control field of the sensing NDP request frame; generate an NDP frame using the transmit parameters; and send, in response to the sensing NDP request frame, the NDP frame to the second device.

Example 2 may include the device of example 1 and/or some other example herein, wherein the transmit control field comprises a transmit configuration hold sub-field, wherein the transmit configuration hold sub-field consists of one bit indicating that the device is to use the transmit parameters when sending the NDP frame, and wherein the NDP frame is sent using the transmit parameters.

Example 3 may include the device of example 1 and/or some other example herein, wherein the transmit control field comprises a transmit configuration hold sub-field, wherein the transmit configuration hold sub-field consists of one bit indicating that the device is permitted to use different transmit parameters when sending the NDP frame, and wherein the NDP frame is sent using the transmit parameters or the different transmit parameters.

Example 4 may include the device of example 1 and/or some other example herein, wherein the transmit control field comprises a transmit configuration number sub-field, wherein the transmit configuration number sub-field comprises the transmit parameters, and wherein the NDP frame is sent using the transmit parameters.

Example 5 may include the device of example 1 and/or some other example herein, wherein the transmit parameters comprise a transmission power level and a number of transmit antennas, and wherein the NDP frame is sent using the transmit parameters.

Example 6 may include the device of example 1 and/or some other example herein, wherein the transmit parameters comprise a transmitter address and a receiver address, and wherein the NDP frame is sent using the transmit parameters.

Example 7 may include the device of example 1 and/or some other example herein, wherein the NDP frame is a high efficiency (HE) ranging NDP.

Example 8 may include the device of example 1 and/or some other example herein, wherein the processing circuitry is further configured to send a second NDP frame to the second device in response to the sensing NDP request frame.

Example 9 may include the device of example 1 and/or some other example herein, wherein the processing circuitry is further configured to: send a first NDP announcement (NDPA) frame prior to sending the NDP frame; send a second NDPA frame after sending the NDP frame; and sending a second NDP frame after sending the second NDPA frame, wherein the first NDPA frame, the first NDP frame, the second NDPA frame, and the second NDP frame are associated with the wireless local area network channel sounding procedure.

Example 10 may include the device of example 1 and/or some other example herein, wherein the sensing NDP request frame comprises a first station information field and a second station information field, the first station information field comprising a first identifier of the device and a second identifier of a third device.

Example 11 may include the device of example 10 and/or some other example herein, wherein the first station information field comprises at least one of a transmission opportunity sub-field, a transmit configuration hold sub-field, a transmit configuration number sub-field, a transmit power level sub-field, or a number of transmit antennas sub-field.

Example 12 may include the device of example 1 and/or some other example herein, further comprising a transceiver configured to transmit and receive wireless signals comprising the sensing NDP request frame and the NDP frame.

Example 13 may include the device of example 12 and/or some other example herein, further comprising one or more antennas coupled to the transceiver.

Example 14 may include a non-transitory computer-readable medium storing computer-executable instructions which when executed by one or more processors result in performing operations comprising: generating a sensing null data packet (NDP) request frame, the sensing NDP request frame associated with performing a wireless local area network channel sounding procedure; sending the sensing NDP request frame to a first station device, the sensing NDP request frame comprising transmit parameters included in a transmit control field; and identifying an NDP frame received from the first station device in response to the sensing NDP request frame, the NDP frame sent using the transmit parameters and associated with the wireless local area network channel sounding procedure.

Example 15 may include the non-transitory computer-readable medium of example 14 and/or some other example herein, wherein the transmit control field comprises a transmit configuration hold sub-field, and wherein the transmit configuration hold sub-field consists of one bit indicating that the first device is to use the transmit parameters when sending the NDP frame.

Example 16 may include the non-transitory computer-readable medium of example 14 and/or some other example herein, wherein the transmit control field comprises a transmit configuration hold sub-field, wherein the transmit configuration hold sub-field consists of one bit indicating that the first device is permitted to use different transmit parameters when sending the NDP frame.

Example 17 may include a method comprising: identifying, by processing circuitry of a first device, a sensing null data packet (NDP) request frame received from a second device, the sensing NDP request frame associated with performing a wireless local area network channel sounding procedure; identifying transmit parameters included in a transmit control field of the sensing NDP request frame; generating an NDP frame using the transmit parameters; and sending, in response to the sensing NDP request frame, the NDP frame to the second device.

Example 18 may include the method of example 17 and/or some other example herein, further comprising identifying an NDP from the first device.

Example 19 may include the method of example 17 and/or some other example herein, wherein the transmit control field comprises a transmit configuration hold sub-field, wherein the transmit configuration hold sub-field consists of one bit indicating that the first device is to use the transmit parameters when sending the NDP frame, and wherein the NDP frame is sent using the transmit parameters.

Example 20 may include the method of example 15 and/or some other example herein, wherein the transmit control field comprises a transmit configuration hold sub-field, wherein the transmit configuration hold sub-field consists of one bit indicating that the first device is permitted to use different transmit parameters when sending the NDP frame, and wherein the NDP frame is sent using the transmit parameters or the different transmit parameters.

Example 21 may include an apparatus comprising means for: identifying a sensing null data packet (NDP) request frame received from a second device, the sensing NDP request frame associated with performing a wireless local area network channel sounding procedure; identifying transmit parameters included in a transmit control field of the sensing NDP request frame; generating an NDP frame using the transmit parameters; and sending, in response to the sensing NDP request frame, the NDP frame to the second device.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-22, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising processing circuitry coupled to non transitory storage, the processing circuitry configured to:
   identify a sensing request received from a second device, wherein the sensing request signals sensing parameters comprising a number of spatial streams, a transmission power, and a channel bandwidth;
   generate, based on the sensing parameters, a sensing null data packet to transmit, wherein the sensing null data packet is associated with detecting an object or motion;
   generate a spatial mapping matrix for the sensing null data packet;
   map space-time streams to transmit chains based on the spatial mapping matrix; and
   cause transmission of the sensing null data packet to the second device based on the mapping.

2. The device of claim 1, wherein the device is an access point that initiated a sounding procedure, and wherein the second device is a station device.

3. The device of claim 2, wherein the sensing null data packet is transmitted after a null data packet announcement transmission during a null data packet announcement sounding phase.

4. The device of claim 1, wherein the spatial mapping matrix is an identity matrix.

5. The device of claim 1, wherein the device is a station device that initiated a sounding procedure, and wherein the second device is an access point.

6. The device of claim 5, wherein the sensing null data packet is transmitted after a null data packet announcement transmission during a measurement sounding phase.

7. The device of claim 1, further comprising a transceiver configured to transmit and receive wireless signals comprising the sensing null data packet.

8. The device of claim 7, further comprising an antenna coupled to the transceiver to send the sensing null data packet.

9. A non-transitory computer-readable medium storing computer-executable instructions which when executed by one or more processors of a device result in performing operations comprising:
   identifying a sensing request received from a second device, wherein the sensing request signals sensing parameters comprising a number of spatial streams, a transmission power, and a channel bandwidth;
   generating, based on the sensing parameters, a sensing null data packet to transmit, wherein the sensing null data packet is associated with detecting an object or motion;

generating a spatial mapping matrix for the sensing null data packet;

mapping space-time streams to transmit chains based on the spatial mapping matrix; and causing transmission of the sensing null data packet to the second device based on the mapping.

10. The non-transitory computer-readable medium of claim 9, wherein the device is an access point that initiated a sounding procedure, and wherein the second device is a station device.

11. The non-transitory computer-readable medium of claim 10, wherein the sensing null data packet is transmitted after a null data packet announcement transmission during a null data packet announcement sounding phase.

12. The non-transitory computer-readable medium of claim 9, wherein the spatial mapping matrix is an identity matrix.

13. The non-transitory computer-readable medium of claim 9, wherein the device is a station device that initiated a sounding procedure, and wherein the second device is an access point.

14. The non-transitory computer-readable medium of claim 13, wherein the sensing null data packet is transmitted after a null data packet announcement transmission during a measurement sounding phase.

15. A method comprising:

identifying, by processing circuitry of a first device, a sensing request received from a second device, wherein the sensing request signals sensing parameters comprising a number of spatial streams, a transmission power, and a channel bandwidth;

generating, by the processing circuitry and based on the sensing parameters, a sensing null data packet to transmit, wherein the sensing null data packet is associated with detecting an object or motion;

generating, by the processing circuitry, a spatial mapping matrix for the sensing null data packet;

mapping, by the processing circuitry, space-time streams to transmit chains based on the spatial mapping matrix; and causing transmission, by the processing circuitry, of the sensing null data packet to the second device based on the mapping.

16. The method of claim 15, wherein the device is an access point that initiated a sounding procedure, and wherein the second device is a station device.

17. The method of claim 16, wherein the sensing null data packet is transmitted after a null data packet announcement transmission during a null data packet announcement sounding phase.

18. The method of claim 15, wherein the spatial mapping matrix is an identity matrix.

19. The method of claim 15, wherein the device is a station device that initiated a sounding procedure, and wherein the second device is an access point.

20. The method of claim 19, wherein the sensing null data packet is transmitted after a null data packet announcement transmission during a measurement sounding phase.

*   *   *   *   *